Figure 1:
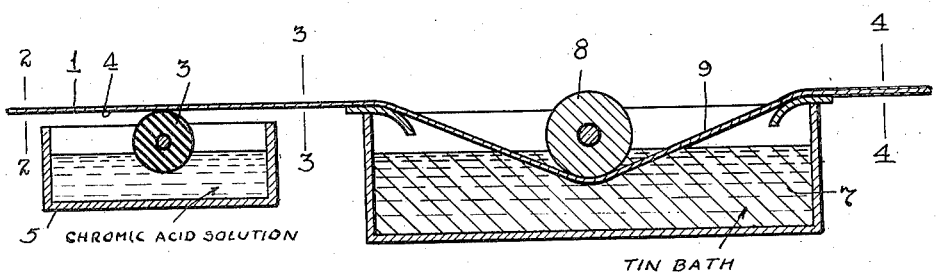

Nov. 22, 1938.　　　C. E. SWARTZ ET AL　　　2,137,464

MANUFACTURE OF BONDED AND COATED METALLIC ARTICLES

Filed Oct. 23, 1936

INVENTORS
Carl E. Swartz and
John E. Wilkey
BY Fay, Oberlin & Fay
ATTORNEYS.

Patented Nov. 22, 1938

2,137,464

UNITED STATES PATENT OFFICE 2,137,464

MANUFACTURE OF BONDED AND COATED METALLIC ARTICLES

Carl E. Swartz, Cleveland Heights, and John E. Wilkey, South Euclid, Ohio, assignors to The Cleveland Graphite Bronze Company, Cleveland, Ohio, a corporation of Ohio Application October 23, 1936, Serial No. 107,226

5 Claims. (Cl. 91—70.3)

The present invention relating as indicated to the manufacture of bonded and coated metallic articles is particularly applicable to a process wherein it is desired to coat or bond a metal with another metal, either similar or dissimilar, in certain selected areas leaving other areas devoid and free of such bonding or coating. The type of bonding or coating process to which the invention is applicable is one in which the bond between the metallic layers is of a chemical nature and there is a partial diffusion of one layer into the other along the bonding line.

The general object and nature of our invention is to provide such a method accomplishing the indicated results, which can be simply, efficiently, quickly and economically performed, and with a substantial saving of raw material required.

The invention is particularly suitable in the manufacture of composite bearing material where it is desired to coat only one side of the backing strip (such as steel) with a bonding metal such as tin. The invention is also applicable to other bonding and coating processes such as tinning of sheet metal forgings and castings, galvanizing, babbitting, soldering, plating, where it is desired to "mask out" or render certain selected areas of a metal backing member inert or passive to the bonding action of another material coming in contact therewith.

Briefly stated, the invention consists in applying a chemical reagent to certain selected areas of a metal backing member, which reagent reacts with such metal to produce a thin film or layer of an inert compound capable of resisting the bonding action of another material in which the backing member is immersed or otherwise placed in contact, and also inert and non-reactive to fluxing agents, leaving those areas, other than the one selected, with a bonded or coated layer of such other material applied thereon. The specific embodiment teaching the manner of practicing our invention, so as to enable it to be readily understood by those skilled in the art, and which embodiment has been selected for the purpose of convenient illustration, relates to the manufacture of composite bearing strip material.

To the accomplishment of the foregoing and related ends, said invention, then, consists of the steps hereinafter fully described and particularly pointed out in the claims.

The annexed drawing and the following description set forth in detail one approved method of carrying out the invention, such disclosed method, however, constituting but one of the various ways in which the principle of the invention may be used.

In said annexed drawing:—

Figure 2:
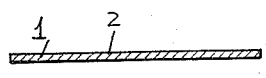
Figure 3:
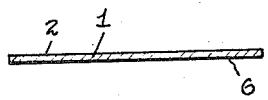
Figure 4:
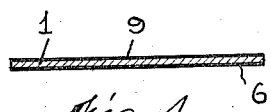

Fig. 1 is a more or less diagrammatic elevational view of an apparatus capable of performing the method embodying the principle of our invention, and as applied to the manufacture of composite bearing strip material; Figs. 2, 3 and 4 are cross sectional views of the strip material taken at successive stages in the performance of the process and substantially along lines 2—2, 3—3, and 4—4 respectively of Fig. 1.

Now referring more particularly to the drawing, a steel strip 1 which is intended to serve as a supporting or backing element of a composite bearing strip, and upon whose upper surface 2 it is desired to apply first a bonding coating of tin and then a layer of bearing material such as babbitt, is passed over the rubber roll 3 with its under side 4 in contact therewith. The rubber roller 3 is partially submerged in a chemical solution contained in the tank or receptacle 5. This chemical solution is capable of reacting with the metal of the steel strip 1 in order to produce a thin film 6 of a chemical compound inert or resistant to the bonding action of the coating or bonding material such as molten tin, in which the strip 1 is immersed. Such resultant chemical compound layer or film 6 is also resistant to the dissolving or penetrating action of fluxing agents which might subsequently be applied to the strip 1. A chromic acid solution has been found to be particularly suitable for the accomplishment of this result. It is believed that the chemical reaction of such a chromic acid solution produces a finely divided but continuous film 6 on the under side of the strip 1, which film probably consists of an iron-chromium-oxide compound. The specific formula for such chromic acid solution may be as follows:

| | | |
|---|---|---|
| Water | gals | 5 |
| Chromic acid | lbs | 12½ |
| Sulphuric acid | cc | 100 |
| Hydrochloric acid | cc | 100 |
| Sodium sulphate | grams | 100 |

Another chemical reagent or solution which may be employed for producing the resistant film 6 consists of an aqueous caustic solution.

After the strip 1 has its under side 4 so treated, resulting in the creation of fine film 6 of inert compound on such under side, it is next passed through the bath 7 of molten tin. A roller 8 leads the strip 1 under the surface of the bath 7. After the strip 1 emerges from the tin bath 7, it has a coating of tin 9 bonded to its upper surface, and its under surface, due to the presence of the protective or inert layer 6, is free of any such tin coating. The resultant strip can then be subjected to a babbitting process wherein it is passed through a pouring box and a bearing metal, such as babbitt, is applied to its upper, tin surface. The performance of such further steps in the application of the bearing metal to the tinned strip is not herein shown or described in detail, but may be further comprehended by reference to the co-pending application of John K. Anthony for "Continuous manufacture of composite bearing material", Serial No. 104,803, filed October 9, 1936.

It will thus be seen that the "masking out" or prevention of the application of the bonding or coating material such as tin to one side of the backing strip 1 is then very simply and quickly effected, and the tin material which would otherwise be bonded to the under side of the strip on its passage through the tin bath is not removed therefrom. In this manner, a given quantity of the tin coating material can be used for coating approximately twice as much of the steel backing strip 1 as would be the case if the backing strip were coated all over its surface and its under side 4 not rendered inert to the bonding or coating action of the tin. It will be readily understood that the principle of our invention is equally applicable to other metal bonding or coating processes wherein it is desired that only certain areas of the backing metal be coated, leaving others blank, it being merely necessary to apply the chemical reagent, such as the chromic acid or caustic solution, to the desired blank areas before placing the backing member in contact with the bonding or coating material. The solution may be applied by equivalent methods other than the one herein specifically shown and described. Such equivalent methods may consist of dipping, brushing or spraying.

Where it is desired to apply a bonding or coating material to a metallic backing in a particular design, the solution may be applied in conjunction with a stencil.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of making composite metallic material, the steps of continuously moving a backing metal strip, applying a chromic acid solution to one side only of said strip, and then immersing said strip in a molten bath of coating metal whereby the other side only of said backing strip is coated.

2. In a method of making composite metallic material, the steps of continuously moving a backing metal strip, applying a chromic acid solution to one side only of said backing strip and then immersing said strip in a tin bath whereby the other side only of said backing strip is tinned.

3. In a method of making composite metallic material, the steps of continuously moving a backing metal strip, applying a solution of 5 gallons water, 12½ pounds chromic acid, 100 cc. hydrochloric acid, and 100 grams sodium sulphate to one side only of said backing strip, and then passing said strip through a molten tin bath, whereby the other side only of said strip is tinned.

4. In a method of making composite metallic material, the steps of applying a chromic acid solution to a predetermined portion of a backing metal, and then immersing said backing metal in a molten bath of coating metal whereby those portions only to which said chromic acid solution had not been applied are coated.

5. In a method of making composite metallic material, the steps of applying a chromic acid solution to a predetermined portion of a backing metal, and then immersing said backing metal in a tin bath whereby those portions only to which said chromic acid solution had not been applied are tinned.

CARL E. SWARTZ.
JOHN E. WILKEY.